United States Patent [19]

Bruce et al.

[11] Patent Number: 4,930,835

[45] Date of Patent: Jun. 5, 1990

[54] WEATHER SEAL FOR VEHICLE TOP PANELS

[75] Inventors: Douglas A. Bruce; Richard C. Essig, both of Broomfield, Colo.

[73] Assignee: Bestop, Inc., Broomfield, Colo.

[21] Appl. No.: 384,779

[22] Filed: Jul. 25, 1989

[51] Int. Cl.$^5$ .............................................. B62D 25/00
[52] U.S. Cl. .................................. 296/102; 296/77.1;
296/83; 296/160; 296/161; 160/368.1;
160/DIG. 18
[58] Field of Search ............... 296/102, 106, 107, 138,
296/160, 161, 83, 77.1; 160/DIG. 18, DIG. 2,
368.1

[56] References Cited

U.S. PATENT DOCUMENTS

| | | | |
|---|---|---|---|
| 1,894,527 | 1/1933 | Yengst | 296/138 |
| 3,167,349 | 1/1965 | Young | 296/107 |
| 4,544,195 | 10/1985 | Gunn | 296/165 |
| 4,639,035 | 1/1987 | Isaacson | 160/368.1 |
| 4,688,846 | 8/1987 | Martin, Jr. | 296/102 |
| 4,858,986 | 8/1989 | Whitley et al. | 296/161 |

FOREIGN PATENT DOCUMENTS 463771 3/1950 Canada .
486792 9/1952 Canada .
953859 12/1956 Fed. Rep. of Germany .

OTHER PUBLICATIONS

Bestop, Inc., 1988 Automotive Accessories Catalog, p. 13, Installation Instructions Jeep Wrangler & YJ (11/88).

Primary Examiner—Robert R. Song
Attorney, Agent, or Firm—W. Scott Carson

[57] ABSTRACT

A vehicle top having removable panel sections wherein the panels include a resilient seal which is compressed by an overlapping flap to form a water-resistant seal between the panel and flap to protect the panel zippers. The seal further includes a concave portion which channels the outside elements away from the zippers. In this manner, the sealing arrangement helps to prevent seepage of water and other elements through the zipper into the interior of the vehicle.

36 Claims, 2 Drawing Sheets

WEATHER SEAL FOR VEHICLE TOP PANELS

BACKGROUND OF THE INVENTION

1. Field of the Invention:

This invention relates to the field of vehicle tops having panels which are at least partially removable from the tops.

2. Statement of the Problem:

Many vehicles today, particularly four-wheel drive type vehicles, have tops with panel sections which are at least partially removable from the top. The current invention involves the use of such panels, including as side and rear panels, with such vehicle tops. Typically, these panels are attached in openings in the top by zippers extending along at least portions of the perimeters of the panels and the openings wherein the panels may be either partially unfastened or completely removed from the tops.

Presently, a problem occurs with the zippers during heavy rainfall or when the vehicle is sprayed with water in that the water flows over the zippers which then tend to leak, allowing water to seep into the interior of the vehicle. Also ice, dust, grit and other outside elements may also penetrate through the zipper and into the interior of the vehicle no matter how seemingly watertight the zipper is.

One approach to this problem has been to form the tops with flap portions which overlap the zippers. While this affords some protection from water flowing directly onto the zippers or from water flowing over the top of the flaps, the flaps in other situations can actually aggrevate the problem of leakage. That is, when water or rain hits the panel at an angle, or when water or other elements are driven along the panel due to turbulence from the movement of the vehicle, the flaps tend to act as pockets to collect and retain the water and other elements against the zippers. Water and other elements thus are collected and concentrated at the very areas which are most susceptible to leaking. This is particularly a problem with the zippers on the side and bottom portions of the panels but can even occur with the top zippers due to the aerodynamic turbulence caused by the moving vehicle.

Therefore, a need exists for a design to protect the zippers on the panels from outside elements as well as to channel water away from the zippers.

3. Solution to the Problem:

The current invention solves these and other problems by providing a weather seal between the flaps and the panels to help prevent water from penetrating to the zippers.

The current invention provides a water-resistant seal to protect the zipped attachment of the panel and top from outside elements.

The seal of the current invention also provides a channelling portion to direct the water away from the zipper and panel.

SUMMARY OF THE INVENTION

The current invention provides a resilient seal attached to the panel adjacent the zipper and extending between the panel and an overlapping flap portion of the top. The seal is designed to be slightly compressed by the overlapping flap as the panel is secured to the top by the zipper. This creates a water-resistant seal to help prevent outside elements from penetrating to the zipper and seeping into the interior of the vehicle. Additionally, the seal is formed with a concave portion which provides a channel to direct water away from the zippers and eliminate any tendency of the water to collect adjacent the zippers.

DETAILED DESCRIPTION OF THE PREFERRED EMBODIMENTs

Figure 1:
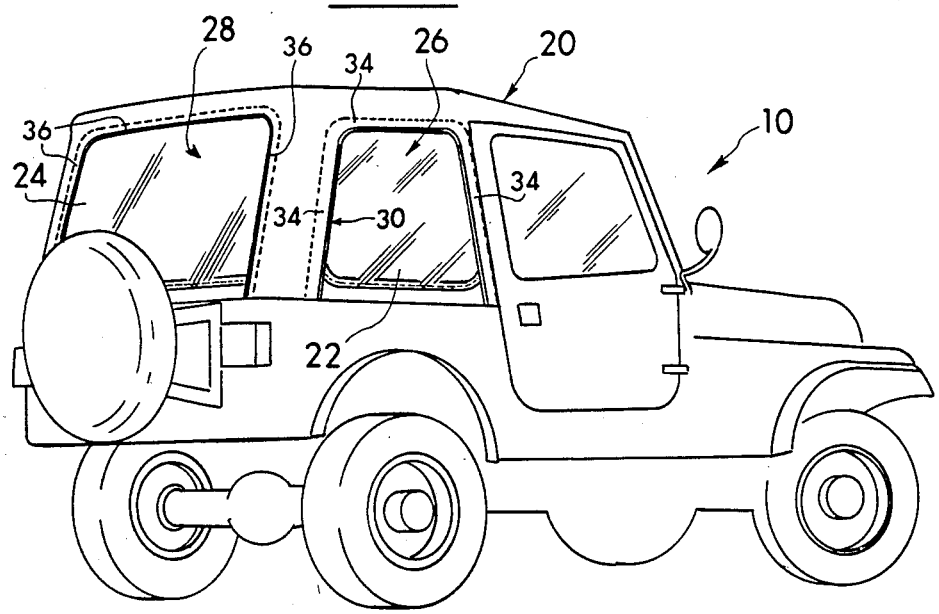
FIG. 1 is a perspective view of a top on a vehicle wherein the top has rear and side panels attached to it.

A typical application for the current invention is illustrated in FIG. 1. In it, the top 20 of the vehicle 10 is formed with side panels 22 and rear panel 24 which are designed to be either partially unfastened or fully removable from the top 20. The panels 22 and 24 are normally attached in the openings 26 and 28 formed in the top 20 by zippers 30 (see FIG. 2) which are mounted on at least a portion of the perimeter of the panels 22 and 24 and the openings 26 and 28 in the top 20.

Figure 2:
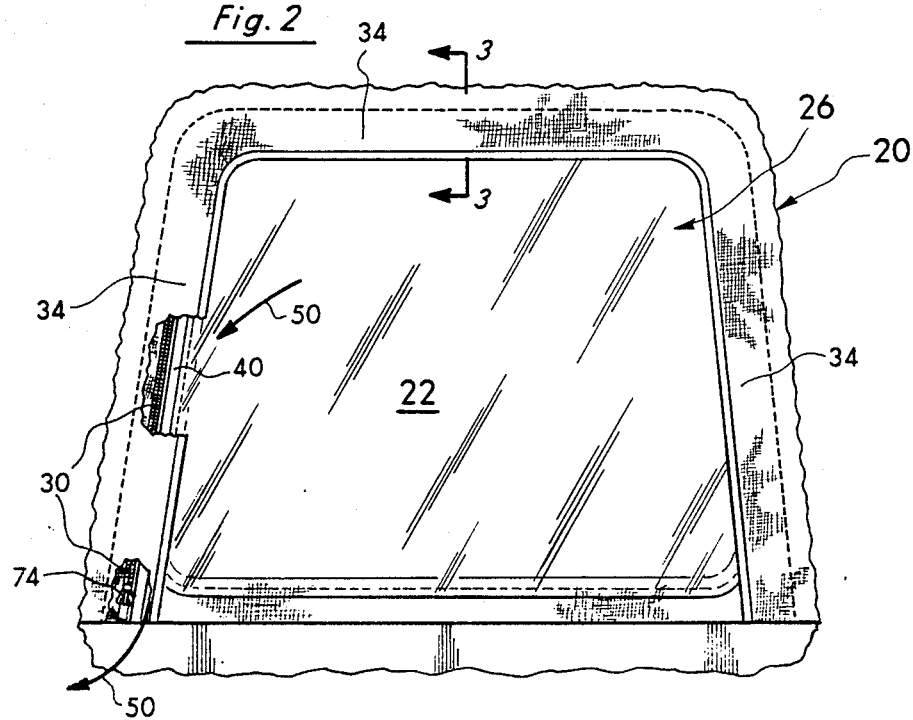
FIG. 2 is a cutaway view of one of the side panels mounted in the top.

In a known manner to provide some measure of protection to the zippers 30 from the outside elements, the tops 20 are sometimes formed as shown in FIGs. 1 and 2 with flap portions 34 and 36 which overlap the zippers 30 (see FIG. 2). The flap portions 34 and 36 protect the zippers 30 from rain falling directly on the zippers 30 or from run off coming from the top or sides of the vehicle 10 when the vehicle 10 is stationary. However, when rain or water is sprayed on the panels 22 and 24 from an angle, the water tends to flow underneath the flaps 34 and 36 and onto the zippers 30 where it may seep into the interior of the vehicle 10. Additionally, when the vehicle 10 is in motion, turbulence can cause water and or other elements to flow underneath the flaps 34 and 36 onto the zippers 30 and seep into the vehicle 10. Consequently, the flap portions 34 and 36 may actually increase the seepage problem by creating pockets for water and other outside elements such as ice, dust, and grit to concentrate over the zippers 30. In contrast, the current invention provides a vehicle top and panel design which protects the zippers 30 from these and other outside elements as well as directing the flow of the outside elements away from the area of the zippers 30.

In the preferred embodiment of the invention as shown in FIG. 2, the panel 22 is releasably attached to the top 20 in the opening 26 by zippers 30 which are mounted on at least portions (e.g., sides and top) of the perimeters of the panel 22 and top 20. For illustrative purposes, the invention is described in detail in reference to side panel 22 but the same operation holds true for the rear panel 24. Additionally, the panels 22 and 24 can be of a completely removable type or simply capable of being partially unfastened as shown.

The zippers 30 are of normal design and include a first or lower ribbon strip 62 (see FIG. 3) attached to at least a portion of the perimeter of the panel 22 and a second or upper ribbon strip 64 attached to the top 20 at a location spaced from the perimeter of the opening therein. The ribbon strips 62 and 64 are attached to the panel 22 and the top 20 by single lines of stitching 66 and 68, respectively. The use of the single line of stitching simplifies production of the panel and the top as well as lowering the cost of manufacture. The ribbon strips 62 and 64 have zipper tracks 70 and 72 mounted by well known means on the free edges of the ribbon strips 62 and 64. A zipper member 74 (see FIG. 2) is attached to one of the zipper tracks 70 and 72 to be freely slidable on the tracks connecting and disconnecting the zipper tracks 70 and 72 to selectively secure the panel 22 within the opening 26. In the preferred embodiment, there are separate sets of tracks 70 and 72 and zipper member 74 for each side and top segment of the panel 22. Other attachment devices, such as snaps, could also be used in lieu of the zippers 30 if desired.

Figure 3:
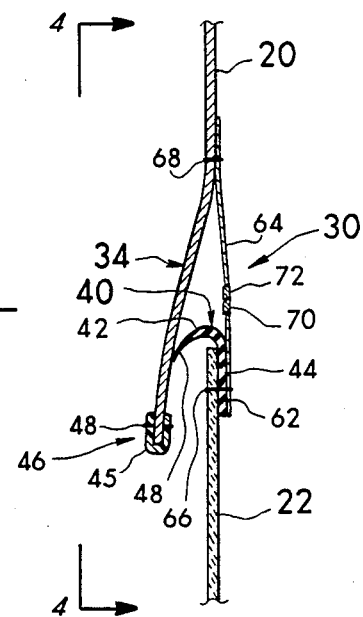
FIG. 3 is a view taken along line 3—3 of FIG. 2.

As shown in FIG. 3, the ribbon strip 64 is attached to the top 20 at a location spaced from the perimeter 46 of the top 20 in order to form a flap portion 34. This flap portion 34 overlaps the zipper 30 as well as a portion of the panel 22 adjacent the zipper 30 when the zipper 30 is secured. As shown, the free edge 46 of the flap portion 34 is protected by a substantially U-shaped member 45 attached over it by stitching 48. The flap portion 34 could, alternatively, be formed on the panel 22, overlapping a portion of the top 20 but the illustrated embodiment is preferred.

Figure 4:
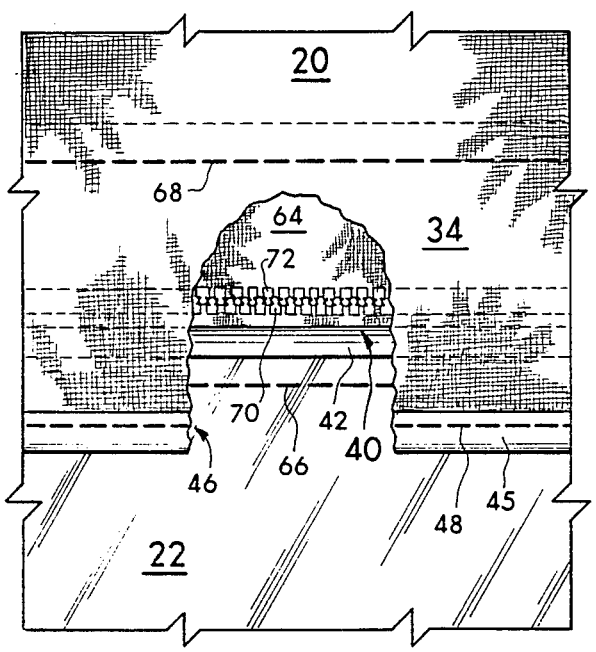
FIG. 4 is a view of the side panel taken along line 4—4 of FIG. 3.

Attached to the panel 22 as illustrated in FIGS. 3 and 4 is a seal 40 formed from a resilient, water-resistant material such as rubber. The seal 40 has a foot portion 42 (see FIG. 3) extending in a cantilever fashion substantially between the panel 22 and overlapping flap 34. The foot portion 42 is mounted to extend between the panel 22 and flap 34 at a location along the flap 34 spaced closer to the zipper 30 than to the free edge 46 of the flap 34. However, the flap 34 need only extend just enough to cover the seal portion 42 which would only have to be immediately below the zipper 30. The seal 40 could also be attached to the flap 34 of the top 20 or if the flap 34 is formed on the panel 22, it could be attached to the top 20 in a similar manner but the illustrated embodiment is preferred.

The flap portion 34 of the top is designed, by the choice of material and by the location of the attachment of the top ribbon strip 64 to form the flap 34, to be sufficiently stiff to exert pressure on the resilient seal portion 42 when the zipper 30 is secured. This pressure compresses the resilient seal portion 42 thus creating a water-resistant seal between the flap 34 and the panel 22 to protect the zipper 30 from water and other outside elements.

In the preferred embodiment, the seal 40 is formed in the shape of an L. As shown in FIG. 3, the stem 44 of the L-shaped seal 40 is secured to the panel 22 between the panel 22 and the panel ribbon strip 62 by the single line of stitching 66. The foot 42 of the L-shaped seal 40 includes a concave portion 48 which forms the cantilever-extending seal portion 42 between the panel 22 and the flap 34.

The concave portion 48 of the seal 40 acts as a channel to direct the water or other elements away from the zipper 30, particularly along the vertically-extending portions of the perimeters of the panel 22. As water or other elements are driven along the panel 22 and underneath the flaps 34 (see FIG. 2), the concave portions 48 of the seal 40 direct the flow 50 of these elements along the seal 40 and away from the zippers 30. As shown in FIG. 2, the flow as indicated by arrow 50 is channeled down the seal 40 to the bottom of the panel 22 and away from the panel 22 and top 20. Thus, not only are the zippers 30 protected by the sealing effect of the flaps 34 and the seals 40 but also the water and other elements are also channeled away from the zippers 30 and off of the panel 22.

It is to be expressly understood that the above description of the preferred embodiment is for purposes of explanation of the invention only and is not meant to limit the scope of the claimed invention in any way. Other types and attachments of the seal are considered to be within the scope of the claimed invention, such as a seal attached to the flap portion; providing the flap portion on the panel rather than the top; differing configurations of the seal; and separate seal and channeling structures. The above list is not meant to be exhaustive but merely descriptive of the types of sealing devices contemplated in the claimed invention.

In operation, the panel 22 is first secured in the opening 26 of the top 20 by sliding the sets of zipper members 74 along the respective tracks 70 and 72 to securely attach the panel 22 to the top 20. As each zipper member 74 is slidably connecting the tracks 70 and 72, the pressure from the flap portion 34 formed on the top 20 begins to compress the cantilever or foot portion 42 of the seal 40 extending between the flap 34 and the panel 22 (see FIG. 3). The compression of the seal 40 forms a water-resistant seal between the panel 22 and the top 20, protecting the zipper 30 from the outside elements. The channel portion 48 of the seal 40 directs the flow 50 of the water or other elements away from the zipper 30, particularly along the vertically-extending portions of the panel 22 (see FIG. 2). To remove the panel 22, the flap 34 is then simply lifted up, the zipper 30 disconnected, and the panel 22 removed.

The current invention is designed to be included as an original equipment top or as a separate panel to be retrofitted to existing tops. The current invention provides a solution to penetration of the panel attachment by outside elements as well as a way to direct the flow of the outside elements away from the attachment means to help prevent the seepage of water and other elements through it into the vehicle.

While several embodiments of the present invention have been shown and described in detail, it is to be understood that various changes and modifications could be made thereto without departing from the scope of the invention.

We claim:

1. A top for a vehicle, said top having at least one opening formed in said top, said top comprising:
    a panel and means for removably attaching at least a portion of said panel to said top in said opening; and,
    means for substantially sealing said attaching means from outside elements, said sealing means including a member overlapping said attaching means when said panel is attached in said opening, said sealing means further including a substantially water-resistant seal and means for mounting said water-resistant seal to extend substantially between said overlapping member and one of said top and said panel to substantially prevent water and other outside elements from passing between said overlapping member and said one of said top and said panel to reach said attaching means.

2. The vehicle top of claim 1 wherein said overlapping member is part of said top and said mounting means mounts said water-resistant seal to one of said panel and said top.

3. The vehicle top of claim 2 wherein said mounting means mounts said water-resistant seal to said panel to extend between said panel and said overlapping member of said top.

4. The vehicle top of claim 1 wherein said sealing means further includes means for channelling water away from said attaching means.

5. The vehicle top of claim 4 wherein said channeling means includes a portion formed on said sealing means.

6. The vehicle top of claim 5 wherein said channelling means includes a concave portion formed on said water-resistant seal.

7. The vehicle top of claim 1 wherein at least a portion of said attaching means extends substantially vertically and said sealing means includes means for channelling water and other outside elements away from said vertically-extending portion of said attaching means.

8. The vehicle top of claim 7 wherein said channelling means includes means for channelling said water and other outside elements downwardly away from said vertically-extending portion of said attaching means.

9. The vehicle top of claim 1 wherein said water-resistant seal is resilient and said vehicle top further includes means for mounting said overlapping member to compress said water-resistant seal between said overlapping member and said one of said top and panel when said panel is attached in said opening to enhance the seal therebetween.

10. The vehicle top of claim 1 wherein said attaching means is mounted at least partly along the perimeters of said panel and said opening in said top.

11. The vehicle top of claim 10 wherein said attaching means includes zipper tracks mounted along at least portions of the perimeters of said panel and said opening in said top and a zipper member to selectively connect and disconnect said zipper tracks to selectively attach said panel in said opening of said top.

12. The vehicle top of claim 1 wherein said attaching means includes a zipper member and zipper tracks mounted on at least portions of said panel and said top adjacent said opening.

13. The vehicle top of claim 12 wherein said top and said panel each includes a ribbon strip portion attached thereto wherein said zipper tracks are respectively mounted to each of said ribbon strip portions.

14. The vehicle top of claim 13 wherein said ribbon strip portions are respectively attached to said top and said panel by stitching.

15. The vehicle top of claim 1 wherein said overlapping member is part of said top and has a free edge with a protective, substantially U-shaped member attached substantially over said free edge.

16. The vehicle top of claim 15 wherein said protective member is attached substantially over said free edge of said overlapping member by stitching.

17. The vehicle top of claim 1 wherein said overlapping member has a free edge and said mounting means mounts said water-resistant seal to extend between said overlapping member and one of said top and said panel at a location along said overlapping member spaced from said free edge thereof.

18. The vehicle top of claim 17 wherein said mounting means mounts said water-resistant seal to extend between said overlapping member and one of said top and said panel at a location along said overlapping member substantially closer to said attaching means than to said free edge.

19. The vehicle top of claim 1 wherein said water-resistant seal is substantially in the shape of an L having a foot and a stem.

20. The vehicle top of claim 19 wherein one of the foot and the stem of said L-shaped water-resistant seal includes means for channelling water and other outside elements away from said attaching means.

21. The vehicle top of claim 20 wherein the other of the foot and the stem of said L-shaped water-resistant seal is secured to said panel.

22. The vehicle top of claim 21 wherein said panel includes a main portion and a ribbon strip portion with part of said attaching means mounted on said ribbon strip portion and said other of said foot and stem of said L-shaped seal being secured to said panel between said main portion and said ribbon strip portion thereof by stitching.

23. The vehicle top of claim 22 wherein said L-shaped seal is secured to said panel between said main portion and said ribbon strip portion thereof by a single stitch line.

24. A panel for a vehicle top, said panel comprising means to removably attach at least a portion of said panel to said vehicle top, and
means for substantially sealing said attaching means from outside elements, said sealing means including a member overlapping said attaching means when said panel is attached to said top, said sealing means further including a substantially water-resistant seal and means for mounting said water-resistant seal to extend substantially between said overlapping member and said panel to substantially prevent water and other outside elements from passing between said overlapping member and said panel to reach said attaching means.

25. The panel of claim 24 wherein said sealing means further includes means for channelling water away from said attaching means.

26. The panel of claim 25 wherein said channelling means includes a portion formed on said sealing means.

27. The panel of claim 26 wherein said channelling means includes a concave portion on said water-resistant seal.

28. The panel of claim 24 wherein said attaching means includes ribbon portions on said panel and top, zipper tracks on said ribbon portions and a zipper member to selectively connect and disconnect said zipper tracks to selectively attach said panel to said top.

29. The panel of claim 24 wherein said water-resistant seal is resilient and said sealing means further comprises means for compressing said resilient seal by said overlapping member when said panel is attached to said top to enhance the seal between said panel and overlapping member.

30. The panel of claim 24 wherein said overlapping member is a portion of said vehicle top which extends over a portion of said panel and said attaching means, and said mounting means mounts said water-resistant seal to said panel to extend between said panel and said overlapping portion of said top.

31. The panel of claim 30 wherein said overlapping member has a free edge and said mounting means mounts said water-resistant seal to extend between said panel and said overlapping member at a location along said overlapping member spaced from said free edge thereof.

32. The panel of claim 31 wherein said mounting means mounts said water-resistant seal to said panel at a location along said overlapping member substantially closer to said attaching means than to said free edge.

33. The panel of claim 24 wherein said water-resistant seal is formed substantially in the shape of an L having a foot and a stem with one of said foot and said stem of the L-shaped seal being secured to said panel.

34. The panel of claim 33 wherein other of the foot and the stem of said L-shaped seal includes means for channelling water and other outside elements away from said attaching means.

35. The panel of claim 34 wherein said panel includes a main portion and a strip portion with part of said attaching means mounted on said strip portion and one of said foot and said stem of said L-shaped seal being secured to said panel between said main portion and said strip portion thereof by stitching.

36. The panel of claim 35 wherein said L-shaped seal is secured to said panel between said main portion and said strip portion thereof by a single line of stitching.

* * * * *